(12) United States Patent
Matsuzaki

US009542629B2

(10) Patent No.: US 9,542,629 B2
(45) Date of Patent: Jan. 10, 2017

(54) IMAGE PROCESSING APPARATUS, IMAGE PROCESSING METHOD, AND PROGRAM

(71) Applicant: CANON KABUSHIKI KAISHA, Tokyo (JP)

(72) Inventor: Masanori Matsuzaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/937,427

(22) Filed: Jul. 9, 2013

(65) Prior Publication Data

US 2014/0016149 A1 Jan. 16, 2014

(30) Foreign Application Priority Data

Jul. 11, 2012 (JP) ................................. 2012-155530

(51) Int. Cl.
| | |
|---|---|
| *G06F 3/12* | (2006.01) |
| *G06F 15/00* | (2006.01) |
| *G06K 15/00* | (2006.01) |
| *H04N 1/29* | (2006.01) |
| *G06K 15/02* | (2006.01) |
| *H04N 1/60* | (2006.01) |

(52) U.S. Cl.
CPC ........ *G06K 15/1878* (2013.01); *H04N 1/6033* (2013.01)

(58) Field of Classification Search
CPC ...... H04N 1/6052; H04N 1/4055; H04N 1/52; H04N 1/00; H04N 1/46
USPC .......................... 358/1.9, 3.23, 518, 520, 534
See application file for complete search history.

(56) References Cited

U.S. PATENT DOCUMENTS

| | | | | |
|---|---|---|---|---|
| 5,396,587 | A * | 3/1995 | Reed | G06F 17/246 715/219 |
| 5,950,036 | A | 9/1999 | Konishi | |
| 6,243,059 | B1 * | 6/2001 | Greene | G09G 3/2092 345/1.3 |
| 6,522,347 | B1 * | 2/2003 | Tsuji | G06Q 30/02 345/419 |

(Continued)

FOREIGN PATENT DOCUMENTS

| | | |
|---|---|---|
| CN | 102243455 A | 11/2011 |
| CN | 102547027 A | 7/2012 |

(Continued)

*Primary Examiner* — Akwasi M Sarpong
(74) *Attorney, Agent, or Firm* — Canon USA, Inc. I.P. Division

(57) ABSTRACT

An image processing apparatus according to the present invention includes an image forming unit configured to form an image, a measuring unit configured to measure the formed image, a control unit configured to control execution of a single-color calibration to be performed to correct reproduction characteristics of a single-color formed by the image forming unit based on a measuring result of a single-color image formed with a single-color recording agent and execution of a multi-color calibration to be performed to correct reproduction characteristics of a multi-color image formed by the image forming unit based on a measuring result of a multi-color formed with a plurality of recording agents, and a selection unit configured to select whether to cause the control unit to perform the multi-color calibration after completing the single-color calibration or cause the control unit to perform any one of the single-color calibration and the multi-color calibration.

20 Claims, 14 Drawing Sheets

(56) References Cited

U.S. PATENT DOCUMENTS

| | | | | |
|---|---|---|---|---|
| 6,724,422 | B1* | 4/2004 | Werner | H04N 1/603 348/187 |
| 7,369,271 | B2* | 5/2008 | Itagaki | H04N 1/60 358/1.9 |
| 7,382,490 | B2* | 6/2008 | Lammens et al. | 358/1.9 |
| 8,400,647 | B2* | 3/2013 | Enami | G09G 5/391 345/173 |
| 8,755,837 | B2* | 6/2014 | Rhoads | G06F 17/30244 382/162 |
| 2002/0122044 | A1* | 9/2002 | Deering | G06F 3/1431 345/597 |
| 2002/0180998 | A1 | 12/2002 | Wu | |
| 2003/0048464 | A1* | 3/2003 | Yamada | H04N 1/6005 358/1.9 |
| 2003/0142330 | A1* | 7/2003 | Arakawa | G06K 15/00 358/1.9 |
| 2004/0021900 | A1* | 2/2004 | Arakawa | G06K 15/00 358/1.15 |
| 2005/0128498 | A1* | 6/2005 | Matsuzaki | H04N 1/603 358/1.9 |
| 2005/0195212 | A1* | 9/2005 | Kurumisawa | G01J 3/462 345/604 |
| 2005/0259280 | A1* | 11/2005 | Rozzi | H04N 1/6052 358/1.9 |
| 2006/0212906 | A1* | 9/2006 | Cantalini | H04N 5/44543 725/62 |
| 2007/0035614 | A1* | 2/2007 | Tamaru | H04N 7/147 348/14.08 |
| 2007/0070371 | A1* | 3/2007 | Miyazaki | H04N 1/6022 358/1.9 |
| 2007/0124474 | A1* | 5/2007 | Margulis | G06F 3/14 709/226 |
| 2007/0279656 | A1* | 12/2007 | Yamauchi | H04N 1/6058 358/1.9 |
| 2008/0024844 | A1* | 1/2008 | Yabe | H04N 1/6022 358/518 |
| 2009/0251715 | A1* | 10/2009 | Kita | G03G 15/01 358/1.9 |
| 2010/0033748 | A1* | 2/2010 | Enami | G09G 5/391 358/1.13 |
| 2011/0063633 | A1 | 3/2011 | Ernst et al. | |
| 2011/0199634 | A1 | 8/2011 | Bastani et al. | |
| 2011/0292417 | A1 | 12/2011 | Miyagi | |
| 2011/0299102 | A1* | 12/2011 | Matsuzaki | 358/1.9 |
| 2012/0133960 | A1 | 5/2012 | Henderson | |
| 2013/0038886 | A1* | 2/2013 | Kondo | 358/1.9 |
| 2013/0106810 | A1* | 5/2013 | Kim | G09G 5/02 345/690 |
| 2013/0127928 | A1* | 5/2013 | Myers | 345/173 |
| 2013/0235430 | A1* | 9/2013 | Sakatani | 358/3.23 |

FOREIGN PATENT DOCUMENTS

| | | |
|---|---|---|
| EP | 2387225 A1 | 11/2011 |
| JP | 2004-069803 A | 3/2004 |
| JP | 2009-265371 A | 11/2009 |
| JP | 2010-263345 A | 11/2010 |
| JP | 2010263345 A * | 11/2010 |
| JP | 2011-27830 A | 2/2011 |
| JP | 4677379 B2 | 4/2011 |
| JP | 2011-254350 A | 12/2011 |
| RU | 2327216 C2 | 6/2008 |
| RU | 93977 U1 | 5/2010 |
| WO | 2004/021268 A1 | 3/2004 |

* cited by examiner

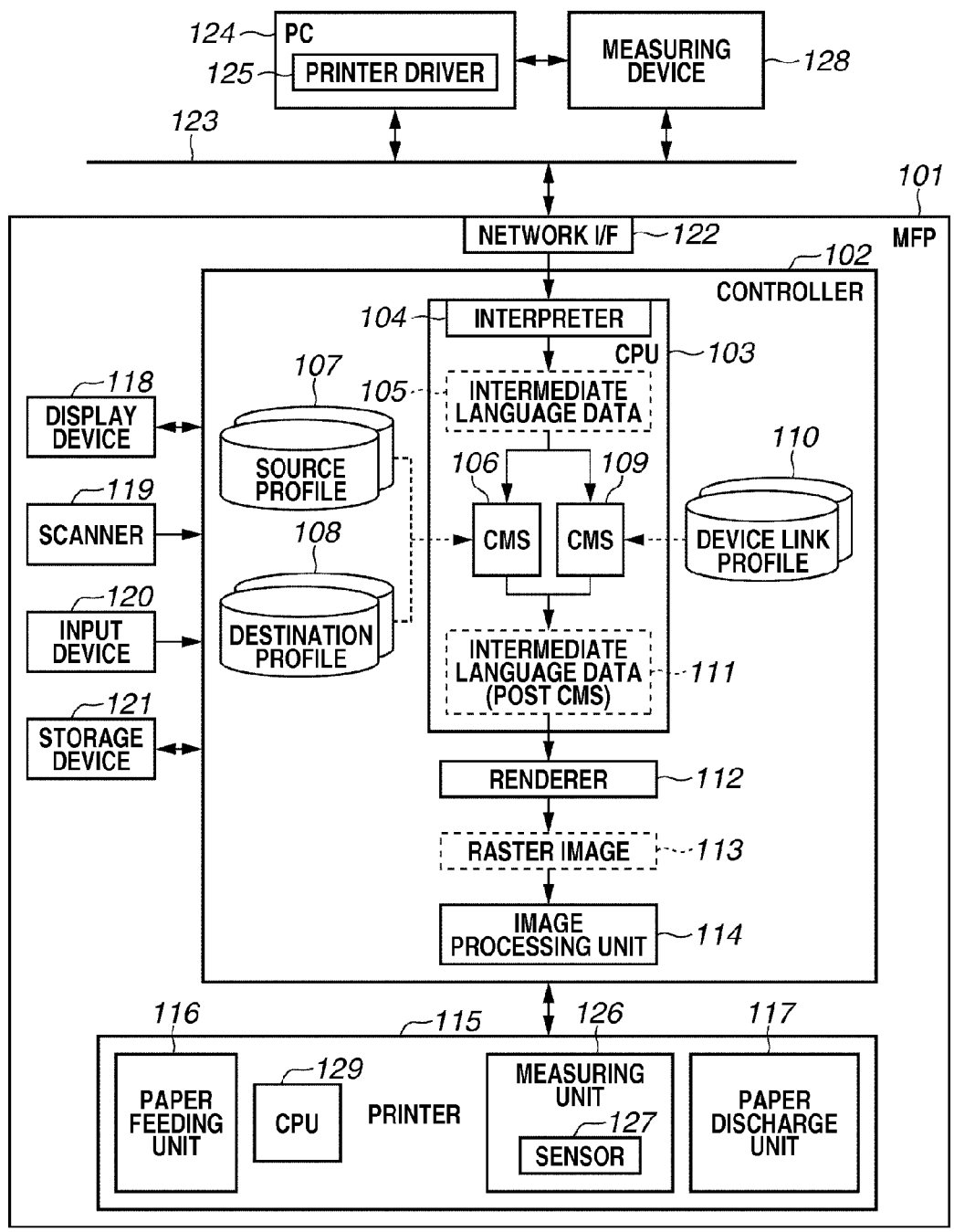

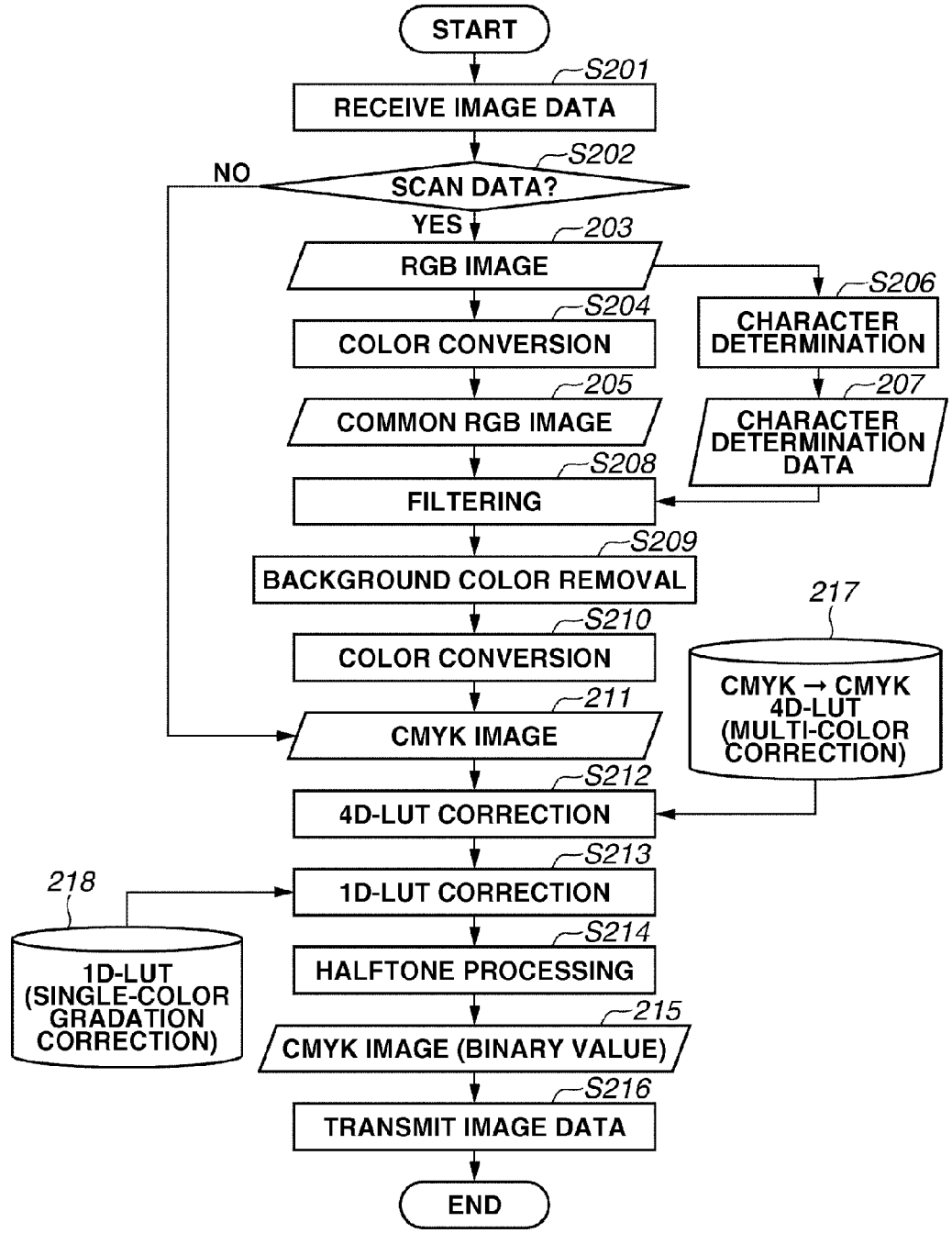

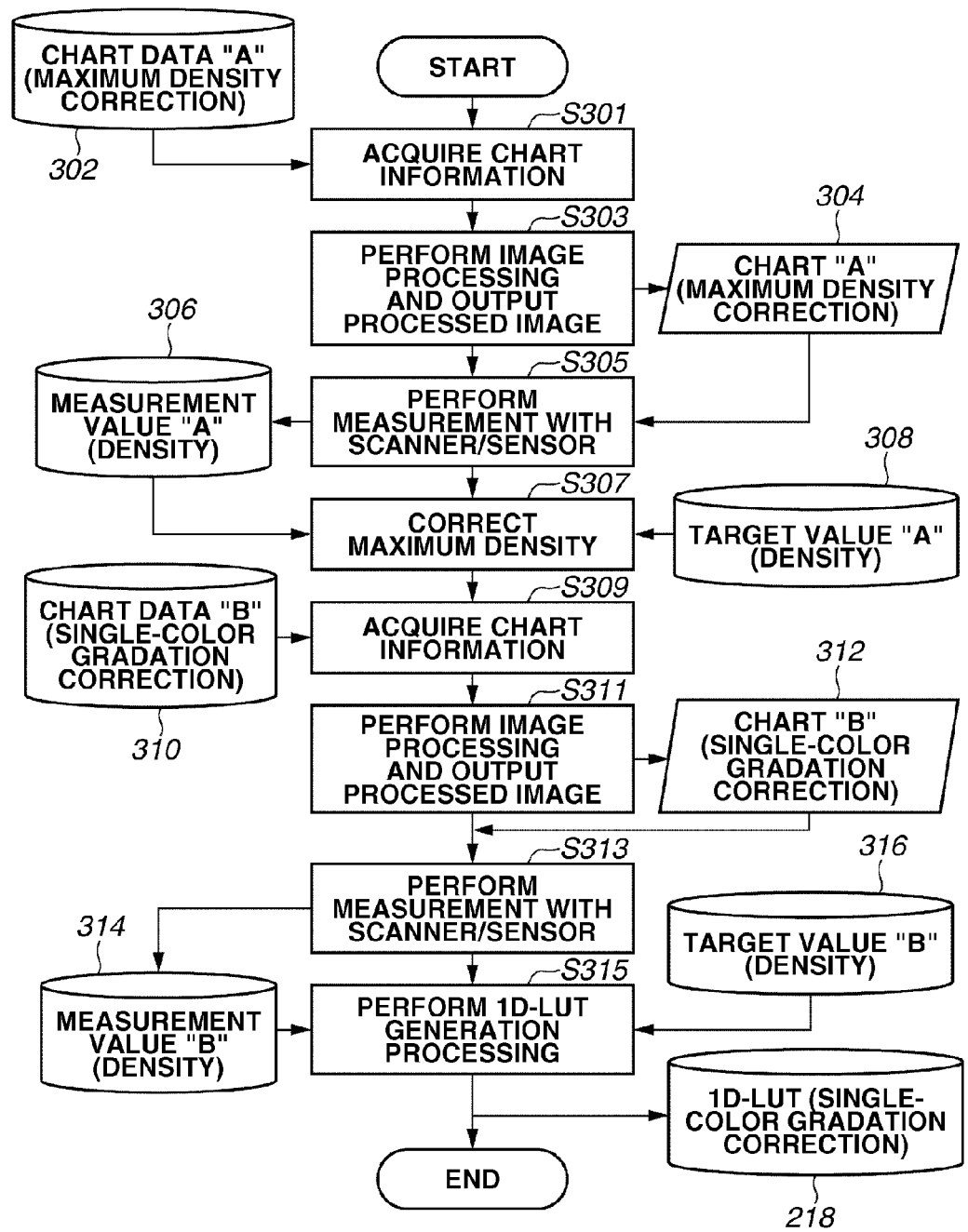

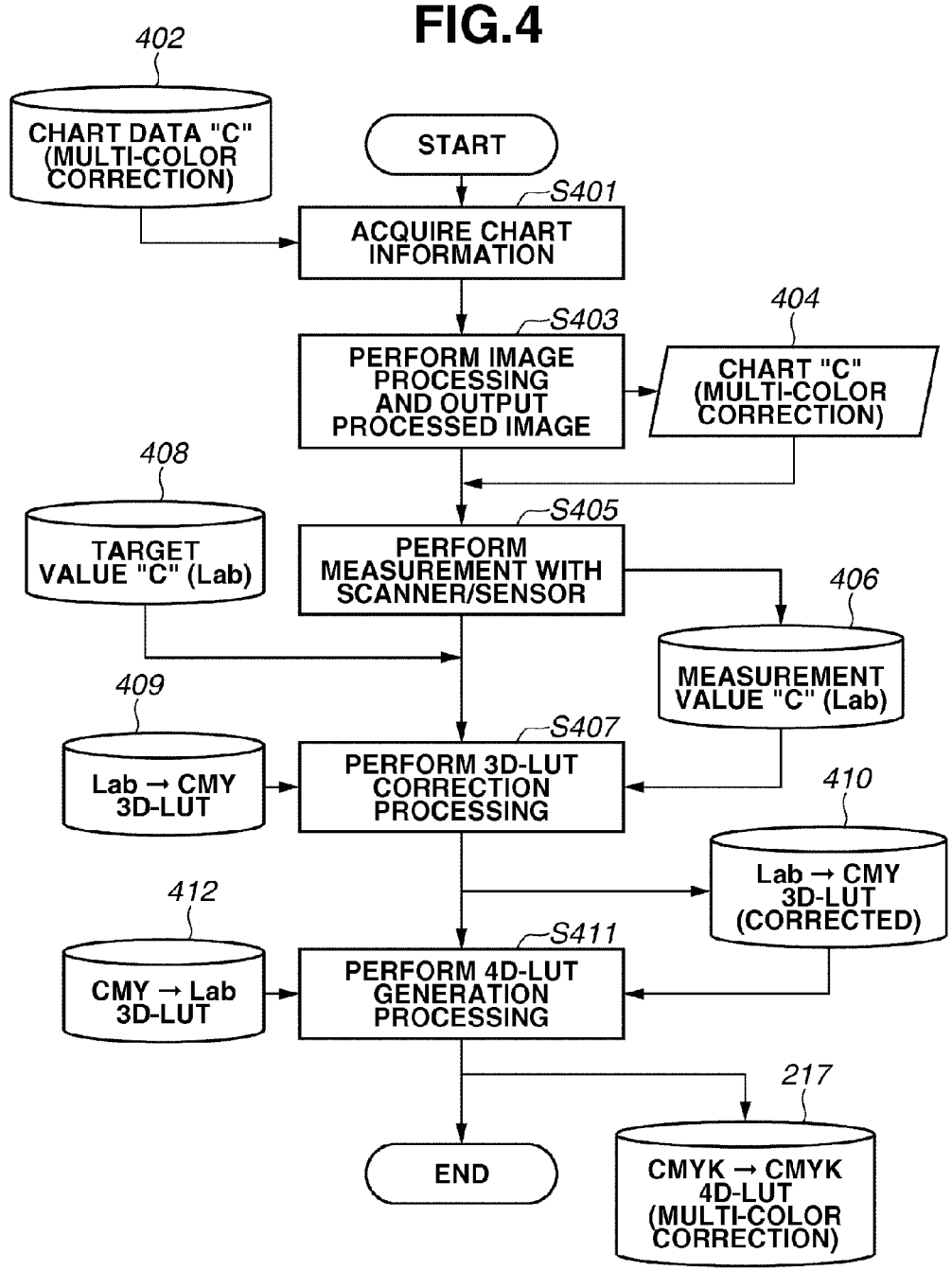

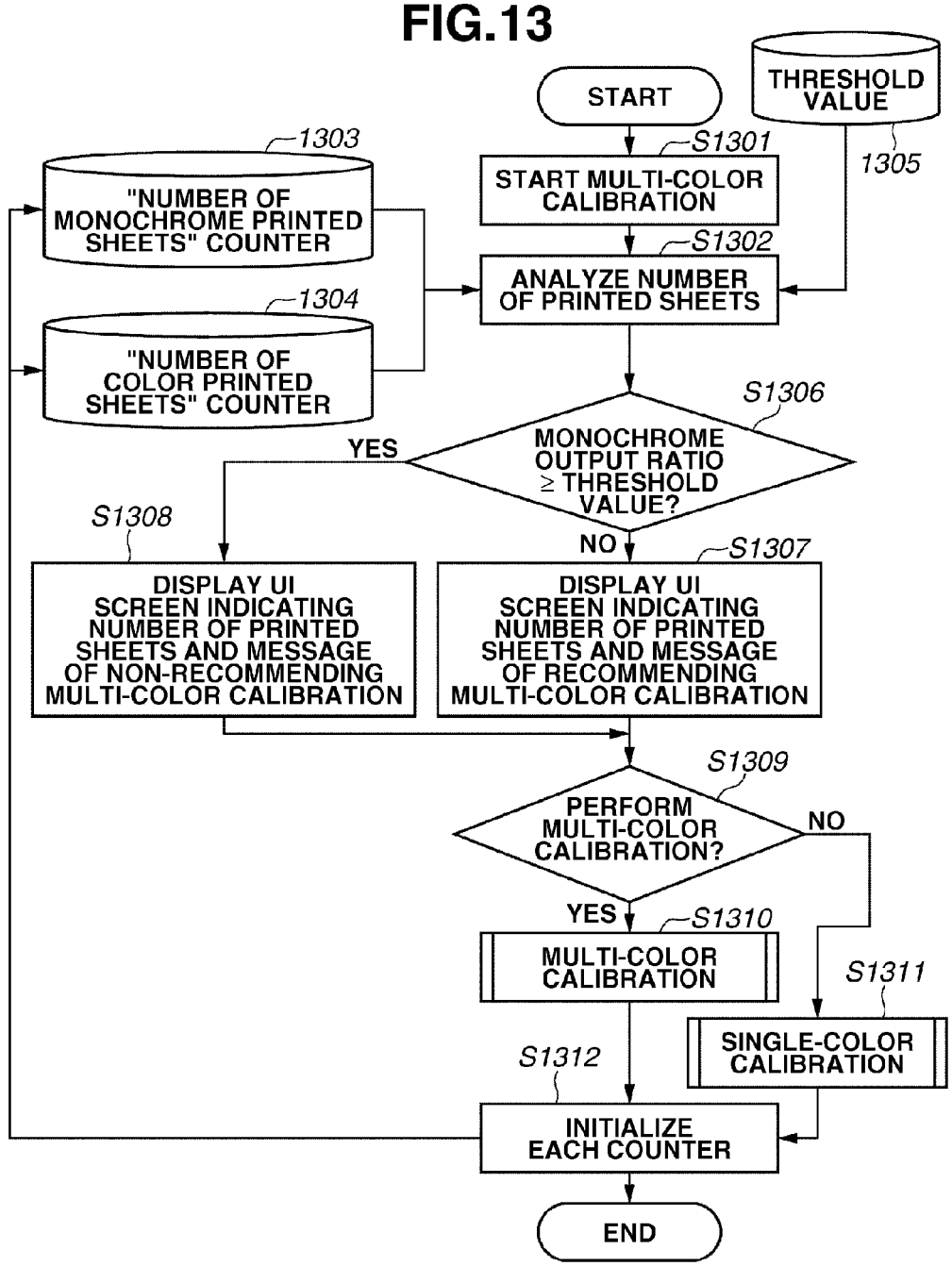

IMAGE PROCESSING APPARATUS, IMAGE PROCESSING METHOD, AND PROGRAM

BACKGROUND OF THE INVENTION

Field of the Invention

The present invention relates to an image processing apparatus and an image processing method that can correct a color of an image to be output from a printer, and a program for generating image processing parameters.

Description of the Related Art

The recent improvement in performance of electrophotographic apparatuses can realize high image quality comparable to that of a printing machine. However, the instability of each electrophotographic apparatus, which is peculiar thereto, tends to cause a color variation that is larger than that of a printing machine.

In general, a "single-color" calibration technique is conventionally installed in an electrophotographic apparatus. The "single-color" calibration technique includes generating a look-up table (LUT) usable to correct one-dimensional gradation characteristics corresponding to each of cyan, magenta, yellow, and black (hereinafter, simply referred to as C, M, Y, and K) toners. The LUT is a table that indicates output data corresponding to respective input data segmented at specific intervals. Using the LUT is useful in expressing nonlinear characteristics to which no calculation formula is applicable. Further, the "single-color" is a color that is reproducible using a single toner of C, M, Y, or K. Performing the single-color calibration is useful to correct single-color reproduction characteristics, such as a maximum density and a gradation.

As discussed in Japanese Patent Application Laid-Open No. 2011-254350, a "multi-color" calibration technique using a four-dimensional LUT is conventionally proposed. The "multi-color" is a composite color that is reproducible using a plurality of toners of red, green, and blue or gray (based on CMY). Especially, according to the electrophotography, even when a one-dimensional LUT is used to correct single-color gradation characteristics, a nonlinear difference tends to occur if a plurality of toners is used to express a "multi-color." Performing the multi-color calibration in such a case is useful to correct multi-color reproduction characteristics which can be expressed by a combination (e.g., a superposition) of a plurality of color toners.

A processing procedure of the calibration including a "multi-color" calibration is described below. First, patches are printed on a recording medium, such as a sheet of paper, based on single-color chart data that is usable to perform the "single-color" calibration. Then, the printed patches are read by a scanner or a sensor. The read patch data is compared with target values having been set beforehand, and a one-dimensional LUT is generated which is used to correct differences between read patch data and the target values. Then, patches are printed on a recording medium based on multi-color chart data that reflects the obtained one-dimensional LUT to perform the "multi-color" calibration, and the printed patches are read by the scanner or the sensor. Further, the read patch data is compared with target values having been set beforehand, and a four-dimensional LUT is generated which is used to correct differences between read patch data and the target values.

As described above, it is feasible to realize highly accurate correction by performing the "multi-color" calibration in such a way as to correct multi-color characteristics that cannot be corrected by the "single-color" calibration.

In addition, it is desirable to start the processing from the "single-color" calibration and then perform the "multi-color" calibration, as described above. However, a significantly long processing time is required to complete both the single-color calibration and the multi-color calibration. For example, in a case of a user who frequently performs single-color printing, there is a higher possibility of performing the single-color calibration because the "multi-color" print is not performed so often. In addition, in an electrophotographic apparatus, there is a tendency that a nonlinear difference occurs in a case of "multi-color" processing as compared with a case of "single-color" processing. Therefore, "multi-color" characteristics may not be sufficiently corrected even in a case where "single-color" characteristics are sufficiently corrected. Accordingly, in a case of a user who frequently performs "multi-color" (e.g., photograph) printing, there is a higher possibility of performing the multi-color calibration rather than performing the single-color calibration.

In response to above-described users' demands, there is a mechanism which provides two buttons independently to enable a user to select each of the single-color calibration and the multi-color calibration and independently perform the selected calibration (see Fuji Xerox technical report NO. 19 2010).

However, according to the above-described technique discussed in Fuji Xerox technical report NO. 19 2010, the single-color calibration and the multi-color calibration are processing to be independently performed. Therefore, if only one of two calibrations is chiefly performed (too often), there is a possibility that the correction accuracy of the calibration may deteriorate.

SUMMARY OF THE INVENTION

According to an aspect of the present invention, an image processing apparatus includes an image forming unit configured to form an image, a measuring unit configured to measure an image formed by the image forming unit, a control unit configured to control execution of a single-color calibration to be performed to correct reproduction characteristics of a single-color formed by the image forming unit based on a measuring result obtained in a case where the measuring unit measures a single-color image formed with a single-color recording agent by the image forming unit, and execution of a multi-color calibration to be performed to correct reproduction characteristics of a multi-color formed by the image forming unit based on a measuring result obtained in a case where the measuring unit measures a multi-color image formed with a plurality of recording agents by the image forming unit, and a selection unit configured to select whether to cause the control unit to perform the multi-color calibration after completing the single-color calibration or cause the control unit to perform any one of the single-color calibration and the multi-color calibration.

According to the present invention, an image processing apparatus capable of selectively performing a single-color calibration or a multi-color calibration can prevent the correction accuracy in the calibration from deteriorating which is caused by that only one of two calibrations is chiefly performed (too often).

Further features of the present invention will become apparent from the following description of exemplary embodiments with reference to the attached drawings.

BRIEF DESCRIPTION OF THE DRAWINGS

FIG. 1 illustrates a configuration of an image processing system.

FIG. 2 is a flowchart illustrating an example procedure of image processing.

FIG. 3 is a flowchart illustrating an example procedure of single-color calibration processing.

FIG. 4 is a flowchart illustrating an example procedure of multi-color calibration processing.

FIG. 13 is a flowchart illustrating an example procedure of calibration processing according to a fourth exemplary embodiment.

DESCRIPTION OF THE EMBODIMENTS

Figure 5A:
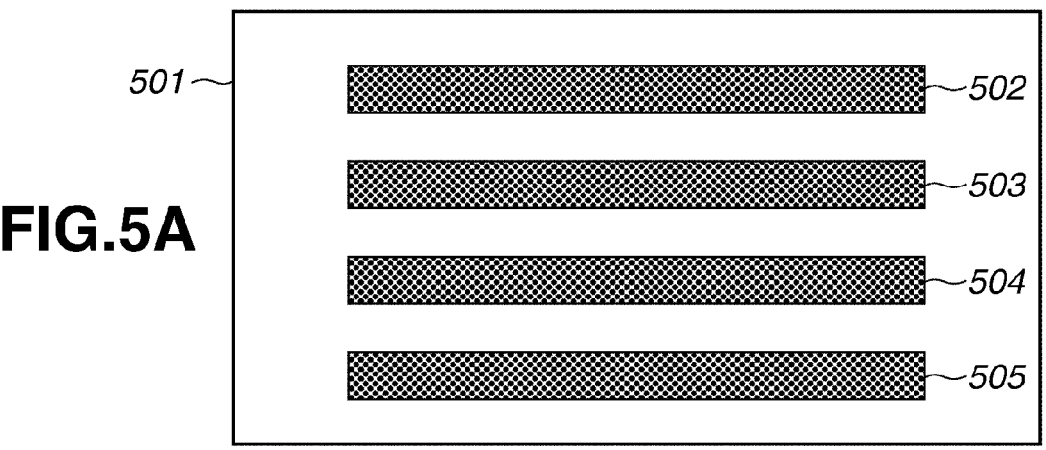
FIGS. 5A to 5C illustrate a plurality of charts that can be used in the single-color calibration and the multi-color calibration.

A first exemplary embodiment of the present invention is described below. According to the present exemplary embodiment, when the calibration is to be performed, a user can select whether to perform both a single-color calibration and a multi-color calibration or to perform one of them. Therefore, the calibration can be performed appropriately considering a usage condition of the user.

Further, according to the present exemplary embodiment, since both of the single-color calibration and the multi-color calibration are periodically performed, it can prevent the correction accuracy in the calibration from deteriorating.

FIG. 1 illustrates a configuration of an image processing system according to the present exemplary embodiment. A multi function printer (MFP) 101 is an image processing apparatus that forms images using cyan, magenta, yellow, and black (hereinafter, C, M, Y, and K) toners. The MFP 101 is connected to other network devices via a network 123. A personal computer (PC) 124 is connected to the MFP 101 via the network 123. The PC 124 includes a printer driver 125 that transmits print data to the MFP 101.

The MFP 101 is described in detail below. A network interface (I/F) 122 can receive print data. A controller 102 includes a central processing unit (CPU) 103, a renderer 112, and an image processing unit 114. The CPU 103 includes an interpreter 104 that can interpret a page description language (PDL) portion included in the received print data and generate intermediate language data 105.

A color management system (CMS) 106 can perform color conversion using a source profile 107 and a destination profile 108, and can generate intermediate language data (post CMS) 111. Profile information usable in the color conversion to be performed by the CMS 106 is described below. The source profile 107 is used to convert a device-dependent color space, e.g., RGB and CMYK color spaces, into a device-independent color space, e.g., L*a*b* (hereinafter, referred to as "Lab") and XYZ color spaces. Lab is the color space specified by the CIE (Commission Internationale de l'Eclairage=International Commission on Illumination). XYZ is also a device-independent color space that is similar to Lab, which can express a color with three types of stimulus values. The destination profile 108 is used to convert a device-independent color space into a device (e.g., printer 115) dependent CMYK color space.

On the other hand, another color management system (CMS) 109 can perform color conversion using a device link profile 110 and can generate intermediate language data (post CMS) 111. The device link profile 110 is used to directly convert a device-dependent color space (e.g., RGB or CMYK) into the device (e.g., the printer 115) dependent CMYK color space. Selection of the CMS 106 or the CMS 109 is determined according to a setting by the printer driver 125.

According to the present exemplary embodiment, a plurality of color management systems (106 and 109) is provided according to the type of each profile (107, 108, or 110). However, a single CMS can be configured to process a plurality of types of profiles. Further, the type of each profile is not limited to the examples described according to the present exemplary embodiment. Any type of profile can be used if it can use the device-dependent CMYK color space of the printer 115.

The renderer 112 can generate a raster image 113 based on the generated intermediate language data (post CMS) 111. The image processing unit 114 can perform image processing on the raster image 113 or an image read by a scanner 119. The image processing unit 114 is described in detail below.

The printer 115 which is connected to the controller 102 is a printer capable of forming an image on a sheet using C, M, Y, and K color toners based on output data. The printer 115 includes a paper feeding unit 116 that can feed paper as a recording material, a paper discharge unit 117 that can discharge the paper on which an image is formed, and a measuring unit 126.

The measuring unit 126 includes a sensor 127 that can obtain a spectral reflectance value and a device-independent color space (e.g., Lab or XYZ) value. The printer 115 includes a CPU 129 that can control various operations to be performed by the printer 115. The CPU 129 can control the measuring unit 126. The measuring unit 126 reads a patch from a recording medium (e.g., paper) printed by the printer 115 with the sensor 127. The measuring unit 126 transmits numerical information obtained from the patch to the controller 102. The controller 102 performs calculations using the numerical information received from the measuring unit 126. The controller 102 utilizes the calculation result for performing the single-color calibration or the multi-color calibration.

The MFP 101 includes a display device 118 which is operable as a user interface (UI) for displaying an instruction message to a user or an operational state of the MFP 101. The display device 118 can be used in the single-color calibration or the multi-color calibration.

The scanner 119 includes an auto document feeder. The scanner 119 irradiates image(s) on a bundle of documents or a sheet of a document with light emitted from a light source (not illustrated) and cause a lens to form a reflected document image on a solid-state image sensor, such as a charge coupled device (CCD) sensor. Then, the scanner 119 obtains a raster image reading signal, as image data, from the solid-state image sensor.

The MFP 101 includes an input device 120 that is operable as an interface that receives instructions input by a user. The input device may be partly configured as a touch panel and integrated with the display device 118.

The MFP 101 includes a storage device 121 that stores data processed by the controller 102 and data received from the controller 102.

A measuring device 128 is an external measuring device that is connected to a network or to the PC 124. Similar to the measuring unit 126, the measuring device 128 can obtain a spectral reflectance value and a device-independent color space (e.g., Lab or XYZ) value.

Next, an example of processing to be performed by the image processing unit 114 is described with reference to FIG. 2. FIG. 2 is a flowchart illustrating an example of image processing applied to the raster image 113 or an image read by the scanner 119. An Application Specific Integrated Circuit (ASIC) (not illustrated) included in the image processing unit 114 executes the processing illustrated in FIG. 2.

In step S201, the image processing unit 114 receives image data. Then, in step S202, the image processing unit 114 determines whether the received data is scanning data received by the scanner 119 or the raster image 113 received from the printer driver 125.

If the received data is not the scanning data (NO in step S202), the received data is the raster image 113 having been bitmap rasterized by the renderer 112. The raster image 113 becomes a CMYK image 211 which is converted into printer device-dependent CMYK by the CMS.

If the received data is the scanning data (YES in step S202), the received data is an RGB image 203. Therefore, in step S204, the image processing unit 114 performs color conversion processing to generate a common RGB image 205. The common RGB image 205 is an image defined in a device-independent RGB color space and can be converted into a device-independent color space (e.g., Lab) through calculations.

On the other hand, in step S206, the image processing unit 114 performs character determination processing to generate character determination data 207. According to the present exemplary embodiment, the image processing unit 114 detects an edge of the image or the like to generate the character determination data 207.

Next, in step S208, the image processing unit 114 performs filter processing on the common RGB image 205 using the character determination data 207. According to the present exemplary embodiment, the image processing unit 114 differentiates the filter processing applied to a character portion and the filter processing applied to the remaining portion.

Next, in step S209, the image processing unit 114 performs background color removal processing. In step S210, the image processing unit 114 performs color conversion processing to generate the CMYK image 211 from which the background has been removed.

Next, in step S212, the image processing unit 114 performs multi-color correction processing using a four-dimensional look up table (4D-LUT) 217. The 4D-LUT is usable to convert a combination of C, M, Y, and K signal values into a combination of different C, M, Y, and K signal values in outputting respective toners. The 4D-LUT 217 can be generated by the "multi-color calibration" described below.

Thus, it becomes feasible to correct a "multi-color", i.e., a composite color obtainable using a plurality of toners, with reference to the 4D-LUT.

If the multi-color correction processing in step S212 is completed, then in step S213, the image processing unit 114 corrects single-color gradation characteristics of respective C, M, Y, and K colors, using a one-dimensional look up table (1D-LUT) 218. The 1D-LUT is usable to correct each of the C, M, Y, and K colors (i.e., single-colors). The 1D-LUT 218 can be generated by the "single-color calibration" described below.

Finally, in step S214, the image processing unit 114 performs halftone processing (e.g., screen processing, error diffusion processing, or the like) to generate a CMYK image (binary value) 215. Then, in step S216, the image processing unit 114 transmits the processed image data to the printer 115.

An example of the "single-color calibration" for correcting single-color gradation characteristics to be output from the printer 115 is described with reference to FIG. 3. Performing the single-color calibration is useful to correct single-color color reproduction characteristics (e.g., maximum density characteristics and gradation characteristics). The color reproduction characteristics corresponding to the respective C, M, Y, and K toners used by the printer 115 can be corrected together when the calibration is performed. More specifically, the processing in the flowchart illustrated in FIG. 3 can be performed simultaneously for the respective C, M, Y, and K colors.

FIG. 3 is the flowchart illustrating a processing procedure for generating the 1D-LUT 218 to be used to correct the single-color gradation characteristics. The CPU 103 performs the processing in the flowchart illustrated in FIG. 3. The storage device 121 stores the generated 1D-LUT 218. The display device 118 displays a UI screen including an instruction message to a user. The input device 120 receives an instruction from the user.

In step S301, the CPU 103 obtains chart data "A" 302 stored in the storage device 121. The chart data "A" 302 is used to correct the maximum density of each single color. The chart data "A" 302 includes signal values (e.g., 255) based on which maximum density data of respective C, M, Y, and K "single-colors" can be obtained.

Next, in step S303, the CPU 103 causes the image processing unit 114 to perform image processing on the chart data "A" 302, and causes the printer 115 to print a chart "A" 304. FIG. 5A illustrates an example of a chart 501 printed based on the chart data "A" 302. The chart 501 includes four patches 502, 503, 504, and 505 of the respective C, M, Y, and K colors which have been printed at their maximum densities. In this case, the image processing unit 114 performs only the halftone processing in step S214. The image processing unit 114 does not perform the 1D-LUT correction processing in step S213 and does not perform the 4D-LUT correction processing in step S212.

Next, in step S305, the CPU 103 measures the density of the printed product of the chart "A" 304 with the scanner 119 or the sensor 127 provided in the measuring unit 126, and obtains a measurement value "A" 306. The measurement value "A" 306 indicates a density value of each of the C, M, Y, and K colors. Next, in step S307, the CPU 103 corrects the maximum density of the measurement value "A" 306 of each color with reference to the measurement value "A" 306 and a target value "A" 308 of the maximum density value having been set beforehand. According to the present exemplary embodiment, the CPU 103 adjusts device setting values, such as laser output and development bias, of the printer 115 so as to equalize the maximum density with the target value "A" 308.

Figure 5B:
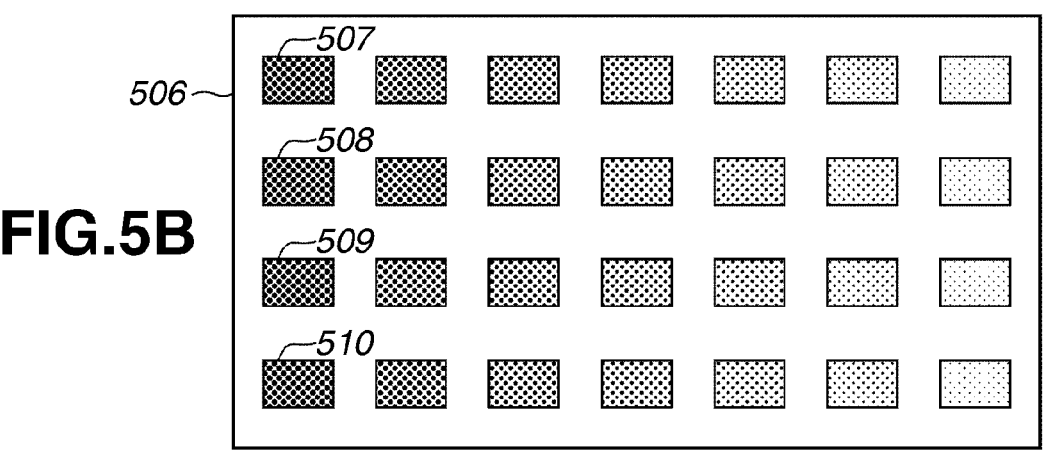

Next, in step S309, the CPU 103 obtains chart data "B" 310 stored in the storage device 121. The chart data "B" 310 includes signal values of "single-color" gradation data of C, M, Y, and K. A chart "B" 312 including patches printed on a recording medium based on the chart data "B" 310 is illustrated in FIG. 5B. A chart 506 illustrated in FIG. 5B is an example of a printed product of the chart "B" 312 including a plurality of patches printed on a recording medium based on the chart data "B" 310. The chart 506 illustrated in FIG. 5B includes four patch groups 507, 508, 509, and 510 each including a plurality of gradation data of C, M, Y, and K colors, respectively.

Next, in step S311, the CPU 103 causes the image processing unit 114 to perform image processing on the chart data "B" 310. The CPU 103 causes the printer 115 to print the chart "B" 312. In this case, the image processing unit 114 performs only the halftone processing in step S214. The image processing unit 114 does not perform the 1D-LUT correction processing in step S213 and does not perform the 4D-LUT correction processing in step S212. The printer 115 is already subjected to the maximum density correction in step S307. Therefore, in this state, the printer 115 can perform printing at the maximum density which is substantially equal to the target value "A" 308.

Next, in step S313, the CPU 103 performs measurement with the scanner 119 or the sensor 127, and obtains a measurement value "B" 314. The measurement value "B" 314 indicates a density value that is obtainable from the gradation of each of C, M, Y, and K colors. Then, in step S315, the CPU 103 generates the 1D-LUT 218 to be used to correct the single-color gradation characteristics based on the measurement value "B" 314 and a target value "B" 316 having been set beforehand.

Next, an example of the "multi-color calibration" for correcting multi-color characteristics to be output from the printer 115 is described with reference to FIG. 4. Performing the multi-color calibration is useful to correct multi-color reproduction characteristics which can be expressed using a combination (or superposition) of a plurality of color toners. The CPU 103 provided in the controller 102 can perform the following processing. The storage device 121 stores the obtained 4D-LUT 217. Further, the display device 118 displays a UI screen including an instruction message to a user, and the input device 120 receives an instruction from the user.

The multi-color calibration is performed for correcting a multi-color to be output from the printer 115 after execution of the single-color calibration. Accordingly, it is desirable to perform the multi-color calibration immediately after completing the single-color calibration.

Figure 5C:
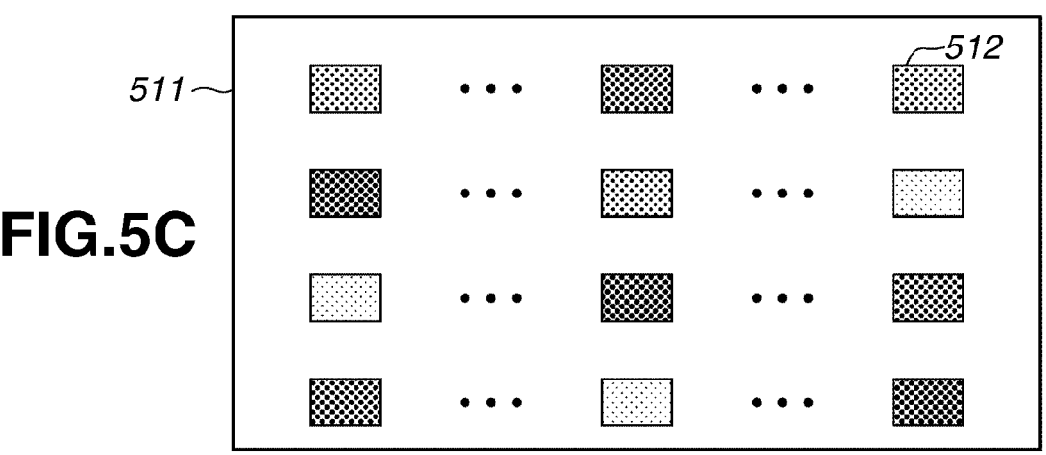

In step S401, the CPU 103 obtains information about "multi-color" chart data "C" 402 stored in the storage device 121. The chart data "C" 402 is used to correct the multi-color and includes signal values of the "multi-color" that is a combination of C, M, Y, and K colors. A chart "C" 404 including a plurality of patches printed on a recording medium based on the chart data "C" 402 is illustrated in FIG. 5C. FIG. 5C illustrates an example of a chart 511 printed based on the chart data "C" 402. A patch 512 and other patches included in the chart 511 is a multi-color patch configured as a combination of C, M, Y, and K colors.

Next, in step S403, the CPU 103 causes the image processing unit 114 to perform image processing on the chart data "C" 402 and causes the printer 115 to print the chart "C" 404. In the multi-color calibration, since the multi-color characteristics of the device is corrected after completing the single-color calibration, the image processing unit 114 performs image processing using the 1D-LUT 218 generated in the single-color calibration.

Next, in step S405, the CPU 103 measures a multi-color of the printed product of the chart "C" 404 by the scanner 119 or the sensor 127 provided in the measuring unit 126, and obtains a measurement value "C" 406. The measurement value "C" 406 indicates multi-color characteristics of the printer 115 after completion of the single-color calibration. Further, the measurement value "C" 406 is defined in a device-independent color space. According to the present exemplary embodiment, the measurement value "C" 406 is a Lab value. If the scanner 119 is used in the measurement, the CPU 103 converts an obtained RGB value into a Lab value using a three-dimensional (3D)-LUT (not illustrated).

Next, in step S407, the CPU 103 obtains a Lab→CMY 3D-LUT 409 stored in the storage device 121 and generates a Lab→CMY 3D-LUT (corrected) 410 by reflecting a difference between the measurement value "C" 406 and a target value "C" 408 having been set beforehand in the obtained Lab→CMY 3D-LUT 409. The Lab→CMY 3D-LUT is a three-dimensional LUT usable to output a CMY value that corresponds to an input Lab value.

As one specific example of generation methods, the CPU 103 adds a difference between the measurement value "C" 406 and the target value "C" 408 to an input-side Lab value of the Lab→CMY 3D-LUT 409 and performs interpolation calculation on the difference reflected Lab value using the Lab→CMY 3D-LUT 409. As a result, the CPU 103 can generate the Lab→CMY 3D-LUT (corrected) 410.

Next, in step S411, the CPU 103 obtains a CMY→Lab 3D-LUT 412 stored in the storage device 121 and performs calculations using the Lab→CMY 3D-LUT (corrected) 410. Accordingly, the CPU 103 generates a CMYK→CMYK 4D-LUT 217. The CMY→Lab 3D-LUT is a three-dimensional LUT usable to output a Lab value that corresponds to an input CMY value.

A method for generating the CMYK→CMYK 4D-LUT 217 is specifically described below. The CPU 103 generates a CMY→CMY 3D-LUT based on the CMY→Lab 3D-LUT 412 and the Lab→CMY 3D-LUT (corrected) 410. Next, the CPU 103 generates the CMYK→CMYK 4D-LUT 217 in such a way as to equalize an input value of K with an output value of K. The CMY→CMY 3D-LUT is a three-dimensional LUT usable to output a corrected CMY value that corresponds to an input CMY value.

Figure 6:
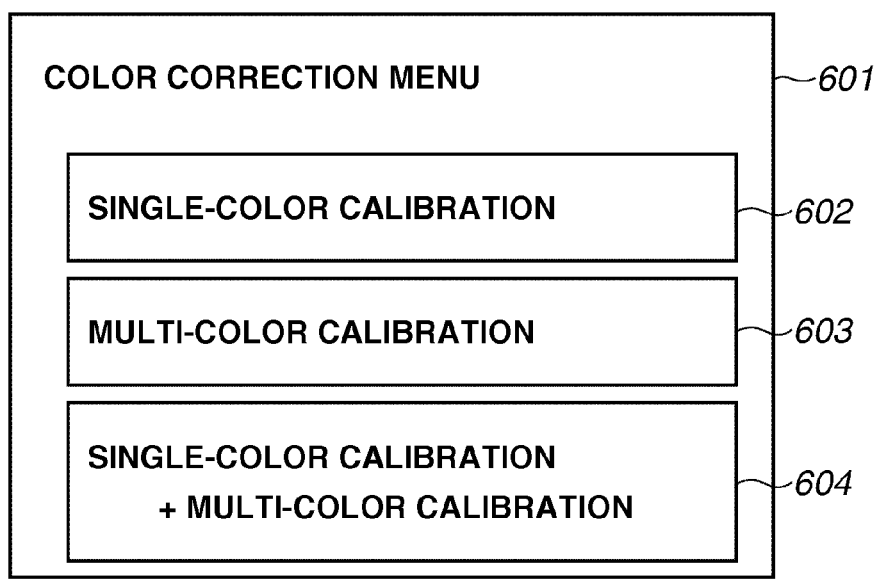
FIG. 6 illustrates an example of a menu screen for executing the single-color calibration and/or the multi-color calibration.

FIG. 6 illustrates an example of a UI screen 601 that enables a user to select the single-color calibration and/or the multi-color calibration. The display device 118 can display the UI screen 601 illustrated in FIG. 6. A button 602 is used for receiving an input of starting the single-color calibration. A button 603 is used for receiving an input of starting the multi-color calibration. A button 604 is used for receiving an input of performing the multi-color calibration after completing the single-color calibration.

In a case where the button 604 is selected, the CPU 103 starts the single-color calibration, and after completing the single-color calibration, starts the multi-color calibration.

More specifically, after completing the single-color calibration, the CPU 103 starts the multi-color calibration with printing the multi-color calibration chart "C" 404. Alternatively, the CPU 103 may cause the display device 118 to display a UI screen including a button for starting the multi-color calibration and start the multi-color calibration if the button is pressed by the user.

On the other hand, in a case where the button 602 is selected, the CPU 103 performs only the single-color calibration. Similarly, in the case where the button 603 is selected, the CPU 103 performs only the multi-color calibration.

The reason why the single-color calibration button and the multi-color calibration button are separately provided is described below. The CPU 103 refers to the 1D-LUT 218 generated in the single-color calibration in printing the chart "C" 404 to be used in the multi-color calibration. Accordingly, it is desirable to perform the multi-color calibration to correct multi-color reproduction characteristics immediately after the single-color calibration has been completed, in other words, immediately after single-color reproduction characteristics have been corrected. However, if the CPU 103 performs both of two types of calibrations, a relatively long processing time is required for a user to complete the calibrations.

Accordingly, to reduce the processing time, the CPU 103 enables a user to select the single-color calibration or the multi-color calibration considering a usage environment. Thus, the frequency of performing each calibration may be variable. For example, if a user often performs monochrome printing, the frequency of performing the multi-color calibration decreases. On the other hand, if a user often performs multi-color printing (e.g., photograph printing), the frequency of performing the multi-color calibration increases.

In addition, it is useful to limit a timing when a user can select a desired button on the color correction menu on the UI screen 601.

In general, the power source of an image processing apparatus is turned off in the night and turned on in the morning. Therefore, it is useful to permit a user to select only the button 604 in response to turning on the power source of the MFP 101. Alternatively, it is useful to permit a user to select only the button 604 if both of the calibrations have not been performed within a predetermined time. Alternatively, it is useful to permit a user to select only the button 604 if both of the calibrations have not been performed until a predetermined number of sheets are used in printing.

Further, the single-color calibration and the multi-color calibration can be automatically performed in series if a predetermined time has elapsed, a predetermined number of sheets are used in printing, or the power source is turned on.

As described above, the system is configured to permit a user to select only the button 604 at a predetermined timing when the user performs the calibration and to prompt a user to select the multi-color calibration immediately after completing the single-color calibration at predetermined intervals.

As described above, a user can select whether to perform the multi-color calibration after completing the single-color calibration (namely, perform both of the calibrations) or perform either the single-color calibration or the multi-color calibration. Accordingly, the calibration can be performed appropriately considering a usage condition of the user.

Further, the system can perform control to permit a user to select performing both calibrations at predetermined time intervals and prevent the correction accuracy of reproduction characteristics in the calibration from deteriorating due to non-execution of one of two calibrations.

Figure 7:
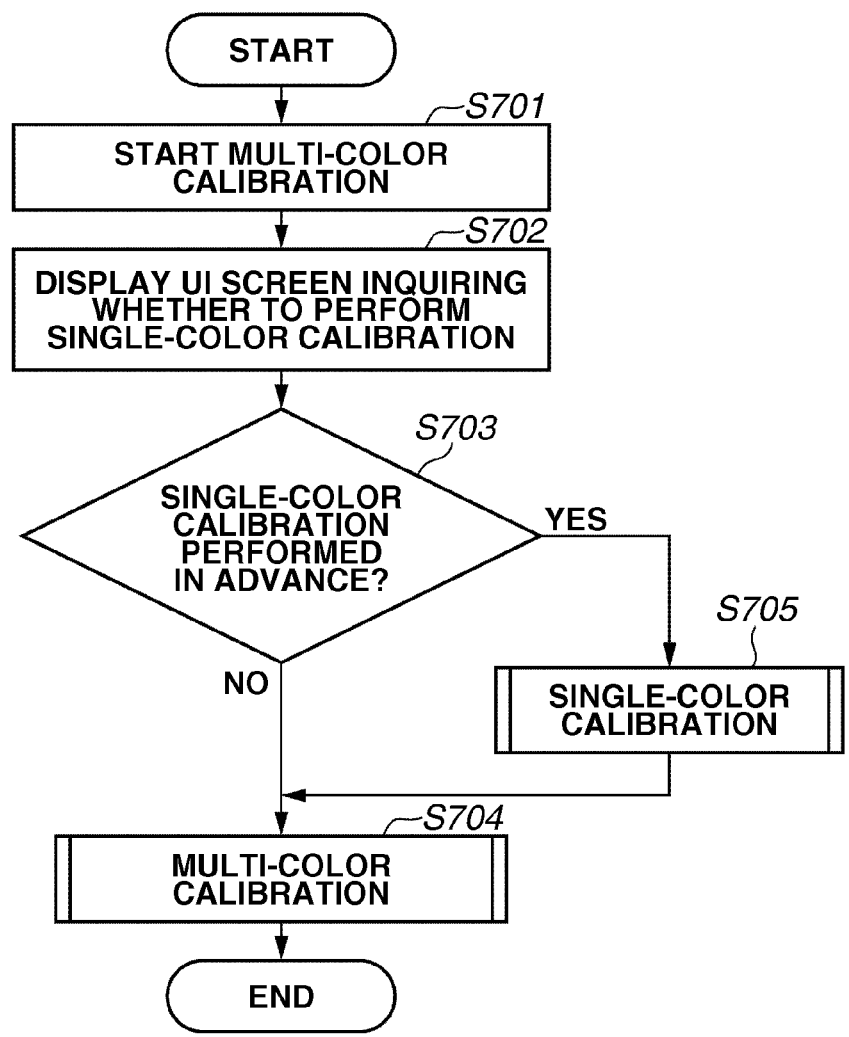
FIG. 7 is a flowchart illustrating an example procedure of the multi-color calibration processing according to a first exemplary embodiment.

Next, an operation to be performed when the button 603 is pressed to select the multi-color calibration is described below. When the button 603 for performing only the multi-color calibration is pressed, the CPU 103 causes the display device 118 to display a UI screen that requests a user to determine whether to perform the single-color calibration before starting the multi-color calibration. Such a UI screen display is useful in preventing the correction accuracy in the multi-color calibration from deteriorating due to non-execution of the single-color calibration. FIG. 7 is a flowchart illustrating an example procedure of calibration processing to be performed when the multi-color calibration is selected. The CPU 103 provided in the controller 102 performs the following processing illustrated in FIG. 7. The storage device 121 stores the obtained data. Further, the display device 118 displays a UI screen including an instruction message to a user, and the input device 120 receives an instruction from the user.

In step S701, the CPU 103 starts the multi-color calibration. More specifically, the multi-color calibration is started when a user presses the button 603 displayed by the display device 118 via the input device 120.

Figure 8:
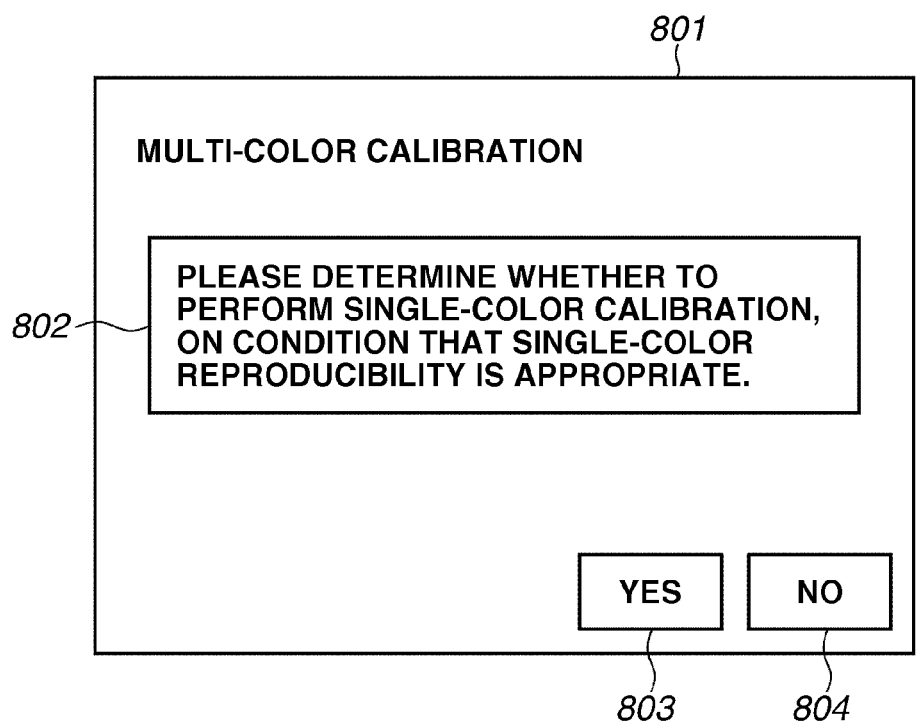
FIG. 8 illustrates an example of a user interface (UI) screen according to the first exemplary embodiment.

Next, in step S702, the CPU 103 displays a UI screen that requests a user to determine whether to perform the single-color calibration. FIG. 8 illustrates an example of a UI screen 801 that can be displayed by the display device 118. The UI screen 801 includes a message field 802 in which a message for prompting a user to determine whether to perform the single-color calibration on condition that single-color reproduction characteristics are appropriate in performing the multi-color calibration (on condition that the single-color calibration has been performed) is displayed. The UI screen 801 includes two buttons 803 and 804 that enable the user to determine whether to perform the single-color calibration in advance. If the "YES" button 803 is selected, the CPU 103 performs the single-color calibration. If the "NO" button 804 is selected, the CPU 103 does not perform the single-color calibration.

The UI screen 801 may be displayed every time when the multi-color calibration is selected and before the multi-color calibration is performed. Alternatively, the UI screen 801 may be displayed only when the number of multi-color calibrations performed after the last single-color calibration exceeds a threshold value. For example, in performing the calibration, the UI screen 801 may be displayed when the multi-color calibrations are consecutively performed five times.

In step S703, the CPU 103 determines whether to perform the single-color calibration in advance. More specifically, the CPU 103 determines whether the user has selected either the button 803 or the button 804 on the UI screen 801.

If it is determined that the single-color calibration is not performed (NO in step S703), then in step S704, the CPU 103 performs the multi-color calibration. The processing to be performed in step S704 is similar to the processing performed in steps S401 to S411, and therefore redundant description thereof will be avoided.

If it is determined that the single-color calibration is performed (YES in step S703), then in step S705, the CPU 103 performs the single-color calibration. Subsequently, in step S704, the CPU 103 performs the multi-color calibration. The processing to be performed in step S705 is similar to the processing performed in steps S301 to S315, and therefore redundant description thereof will be avoided.

In the processing of the flowchart illustrated in FIG. 7, the CPU 103 constantly performs the multi-color calibration after completing the single-color calibration. However, it is useful to enable a user to determine whether to perform the multi-color calibration after completing the single-color calibration.

Through the above-described processing of the flowchart illustrated in FIG. 7, the system can request a user to determine whether to perform the single-color calibration before starting the multi-color calibration. Thus, the correction accuracy in the multi-color calibration can be prevented from deteriorating due to non-execution of the single-color calibration.

Next, an operation to be performed when the button 602 is pressed to select the single-color calibration is described below. If a user presses the button 602 for performing only the single-color calibration, the CPU 103 causes the display device 118 to display a UI screen that requests a user to determine whether to perform the multi-color calibration after completing the single-color calibration. Such a UI screen display is useful in preventing the correction accuracy in the calibration from deteriorating due to non-execution of the multi-color calibration.

As described above, the system performs processing for requesting a user to determine whether to perform the single-color calibration if performing only the multi-color calibration is instructed.

In the above-described processing, as a result of the request, the user may continuously deny to perform the multi-color calibration each time when the single-color calibration is completed. In this case, the user may continue use of the printer which cannot attain the expected accuracy.

Figure 9:
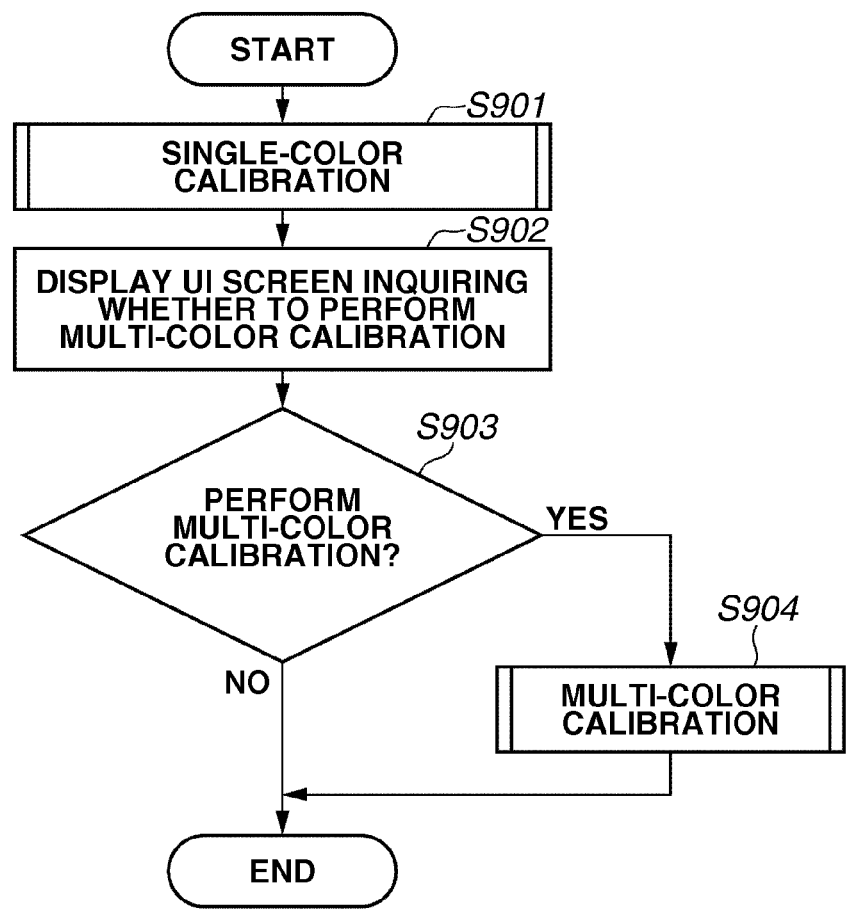
FIG. 9 is a flowchart illustrating an example procedure of the single-color calibration processing according to a second exemplary embodiment.

Considering the above-described situation, the system performs processing illustrated in FIG. 9, which includes displaying a UI screen that requests a user to determine whether to perform the multi-color calibration after completing the single-color calibration.

The CPU 103 provided in the controller 102 performs the processing of the flowchart illustrated in FIG. 9. The storage device 121 stores the obtained data. Further, the display device 118 displays a UI screen including an instruction message to a user, and the input device 120 receives an instruction from the user.

First, in step S901, the CPU 103 performs the single-color calibration.

More specifically, the CPU 103 starts the single-color calibration when a user presses the button 602 displayed by the display device 118 via the input device 120.

The processing to be performed in step S901 is similar to the processing performed in steps S301 to S315, and therefore redundant description thereof will be avoided.

Figure 10:
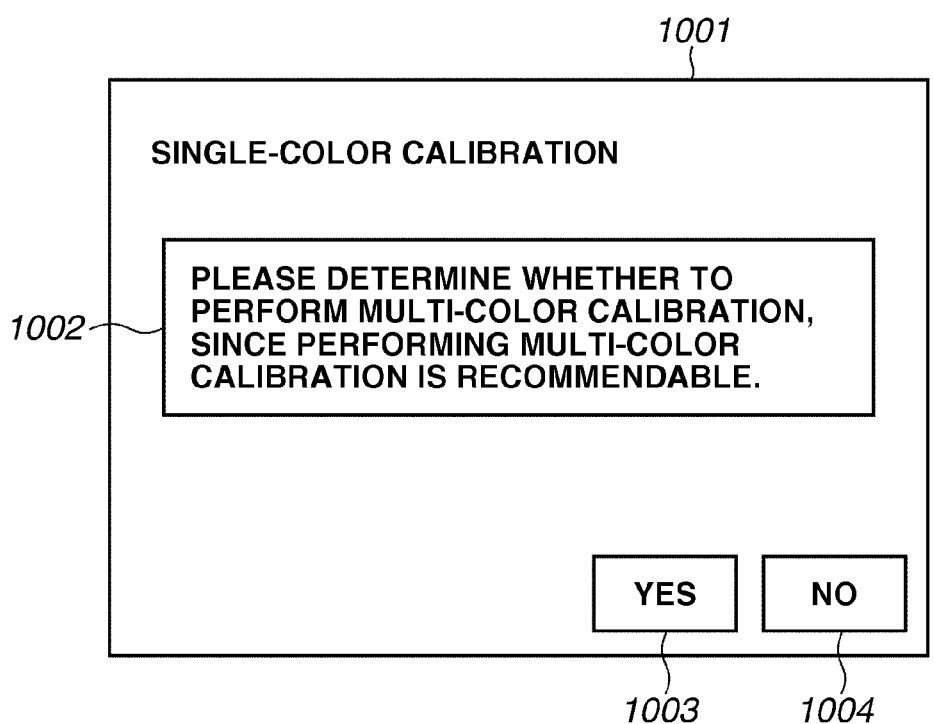
FIG. 10 illustrates an example of a UI screen according to the second exemplary embodiment.

Next, in step S902, the CPU 103 causes the display device 118 to display a UI screen that requests a user to determine whether to perform the multi-color calibration. FIG. 10 illustrates an example of a UI screen 1001 that can be displayed by the display device 118. The UI screen 1001 includes a message field 1002 in which a message for recommending a user to perform the multi-color calibration after completing the single-color calibration is displayed. The UI screen 1001 includes two buttons 1003 and 1004 that enable the user to determine whether to perform the multi-color calibration. If the "YES" button 1003 is selected, the CPU 103 performs the multi-color calibration. If the "NO" button 1004 is selected, the CPU 103 does not perform the multi-color calibration.

The UI screen 1001 may be displayed every time when the single-color calibration is selected. Alternatively, the UI screen 1001 may be displayed only when the number of single-color calibrations performed after the last multi-color calibration exceeds a threshold value. For example, in performing the calibration, the UI screen 1001 may be displayed when the single-color calibrations are consecutively performed five times.

In step S903, the CPU 103 determines whether to perform the multi-color calibration. More specifically, the CPU 103 determines whether the selected button is the "YES" button 1003 or the "NO" button 1004.

If it is determined that the multi-color calibration is not performed (NO in step S903), the CPU 103 terminates the processing of the flowchart illustrated in FIG. 9.

If it is determined that the multi-color calibration is performed (YES in step S903), then in step S904, the CPU 103 performs the multi-color calibration. The processing to be performed step S904 is similar to the processing performed in steps S401 to S411, and therefore redundant description thereof will be avoided.

Through the above-described processing of the flowchart illustrated in FIG. 9, the system can request a user to determine whether to perform the multi-color calibration after completing the single-color calibration among two types of the calibrations. Therefore, the system can prevent the multi-color calibration from being kept unperformed after completing the single-color calibration. Thus, the system can prevent a user from continuously using the printer without obtaining the correction accuracy to be expected in the calibration.

According to the processing procedure described in the first exemplary embodiment, when a user selects one of two calibrations, the CPU 103 requests the user to determine whether to perform the other calibration.

However, a long processing time is required when two types of calibrations are performed constantly and continuously as a result of the request. In addition, when the printer usage status that is variable depending on each user is taken into consideration, a sufficient correction result may be obtained in some cases even when only one of the two types of calibrations is performed. For example, in general, a multi-color is easily variable, compared to a single-color. Therefore, if a user frequently generates multi-color data, such as photograph data, performing the multi-color calibration at a higher frequency compared to that of the single-color calibration may be effective to obtain a sufficient correction result. In this case, a user can determine the execution frequency of the calibration based on user's experience in such a way as to perform the single-color calibration once after continuously performing the multi-color calibration five times.

Accordingly, in a second exemplary embodiment, if a user issues an instruction to perform the multi-color calibration, the system displays the number of multi-color calibrations performed after the last single-color calibration when requesting the user to determine whether to perform the single-color calibration before performing the multi-color calibration.

Figure 11:
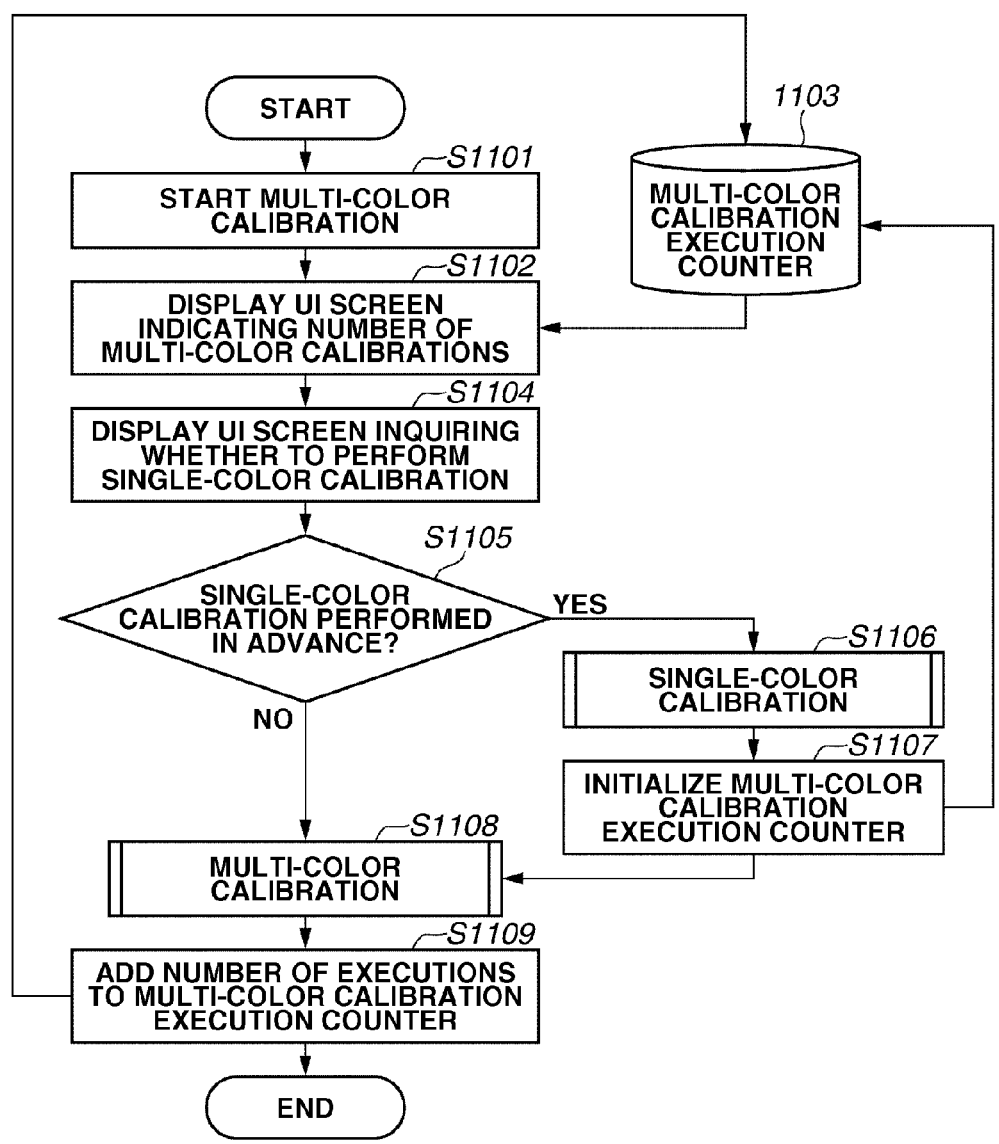
FIG. 11 is a flowchart illustrating an example procedure of calibration processing according to a third exemplary embodiment.

FIG. 11 illustrates a processing procedure according to the present exemplary embodiment. The CPU 103 provided in the controller 102 performs the following processing illustrated in FIG. 11. The storage device 121 stores the obtained data. Further, the display device 118 displays a UI screen including an instruction message to a user, and the input device 120 receives an instruction from the user.

In step S1101, the CPU 103 starts the multi-color calibration.

More specifically, the CPU 103 starts the multi-color calibration if a user presses the button 603 displayed by the display device 118 via the input device 120.

Next, in step S1102, the CPU 103 reads a multi-color calibration execution counter 1103 and displays a UI screen that displays the number of multi-color calibrations having been performed after the last single-color calibration. The multi-color calibration execution counter 1103 stores the number of multi-color calibrations having been performed after the last single-color calibration.

Figure 12:
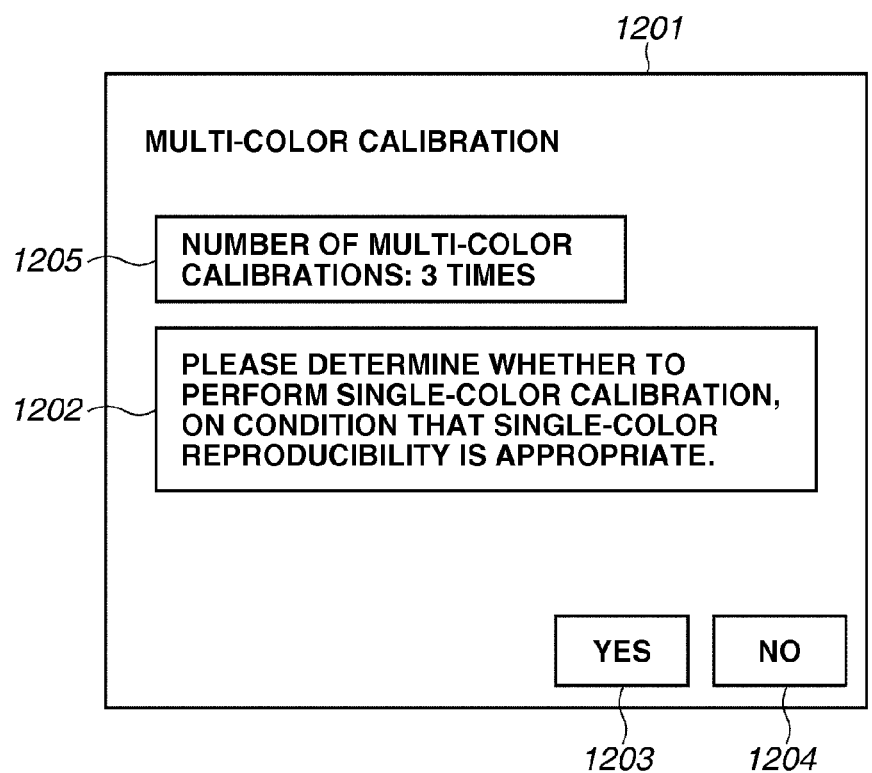
FIG. 12 illustrates an example of a UI screen according to the third exemplary embodiment.

Next, in step S1104, the CPU 103 displays a UI screen that requests a user to determine whether to perform the single-color calibration. FIG. 12 illustrates an example of a UI screen 1201 that can be displayed by the display device 118. The UI screen 1201 includes a message field 1202 and two buttons 1203 and 1204 that are similar to the field 802 and the buttons 803 and 804 illustrated in FIG. 8 and therefore redundant description thereof will be avoided. The UI screen 1201 includes a message field 1205 that indicates the number of multi-color calibrations having been performed after the last single-color calibration. A user who frequently performs the multi-color calibration can check the number of multi-color calibrations and determine whether to perform the single-color calibration before starting the multi-color calibration.

In step S1105, the CPU 103 determines whether to perform the single-color calibration in advance. More specifically, the CPU 103 determines whether either the button 1203 or the button 1204 has been selected.

If it is determined that the single-color calibration is performed before starting the multi-color calibration (YES in step S1105), then in step S1106, the CPU 103 performs the single-color calibration. The processing to be performed in step S1106 is similar to the processing performed in steps S301 to S315, and therefore redundant description thereof will be avoided.

Next, in step S1107, the CPU 103 initializes the multi-color calibration execution counter 1103. In the initialized state, the number of multi-color calibrations performed after the single-color calibration is zero.

On the other hand, if it is determined that the single-color calibration is not performed before starting the multi-color calibration (NO in step S1105), or after completing the initialization of the multi-color calibration execution counter, then in step S1108, the CPU 103 performs the multi-color calibration. The processing to be performed in step S1108 is similar to the processing performed in steps S401 to S411, and therefore redundant description thereof will be avoided.

In step S1109, the CPU 103 adds the number of executions to the multi-color calibration execution counter 1103. Then, the CPU 103 terminates the processing of the flowchart illustrated in FIG. 11. More specifically, as the multi-color calibration has been performed once, the multi-color calibration execution counter 1103 increments its count value by one.

According to the present exemplary embodiment, the number of multi-color calibrations having been performed is displayed in the message field 1205 of the UI screen 1201. Alternatively, it is useful to provide a threshold value beforehand with respect to the number of executions and switch the message contents to be displayed based on a threshold determination result. How to switch the message contents is specifically described below. For example, if it is determined beforehand by a user to perform the single-color calibration after the multi-color calibration has been consecutively performed five times, a threshold value to be set for the number of performed multi-color calibrations is five. In this case, the system does not display a message for recommending the single-color calibration if the number of performed multi-color calibrations is equal to or less than four. However, if the number of performed multi-color calibrations has reached five, the system displays a message for recommending the single-color calibration. The UI contents may be shifted to a screen that informs a user of forcibly starting the single-color calibration when the number of performed multi-color calibrations has reached the threshold value, in addition to the display of the above-described message.

Further, according to the present exemplary embodiment, the system displays the number of multi-color calibrations having been performed after the last single-color calibration. However, any other information can be displayed as long as the information is helpful for a user to determine whether to perform the single-color calibration. For example, it is useful to display date and time when the single-color calibration was performed last time and the present date and time to enable a user to determine whether to perform the single-color calibration.

According to the above-described exemplary embodiment, the system can request a user to determine whether to perform a single-color calibration before starting a multi-color calibration among two types of the calibrations. Thus, the system can prevent the correction accuracy in the multi-color calibration from deteriorating due to non-execution of the single-color calibration.

Further, displaying the number of multi-color calibrations having been performed after the last single-color calibration enables a user to easily determine whether to perform a single-color calibration before starting a multi-color calibration.

Next, a third exemplary embodiment in which the number of color printed sheets is compared with the number of monochrome printed sheets, and a UI screen is switched according to a monochrome printing output ratio is described below.

According to the first exemplary embodiment, when the calibration is performed, the CPU 103 requests a user to determine whether to perform the other calibration.

However, a long processing time is required when two types of calibrations are performed constantly and continuously as a result of the request. In addition, when the printer usage status that is variable depending on each user is taken into consideration, a sufficient correction result may be obtained in some cases even when only one of the two types of calibrations is performed. For example, if a user frequently performs black monochrome printing, the K color (i.e., a single color) is mainly used. Therefore, the execution frequency of the single-color calibration can be increased compared to that of the multi-color calibration.

Considering the above-described situation, the image processing system according to the present exemplary embodiment compares the number of color printed sheets with the number of monochrome printed sheets and switches a UI screen according to a monochrome printing output ratio, as described below.

FIG. 13 illustrates a processing procedure according to the present exemplary embodiment. The CPU 103 provided in the controller 102 performs the following processing illustrated in FIG. 13. The storage device 121 stores the obtained data. Further, the display device 118 displays a UI screen including an instruction message to a user, and the input device 120 receives an instruction from the user.

In step S1301, the CPU 103 starts the multi-color calibration. More specifically, the CPU 103 starts the multi-color calibration if a user presses the button 603 displayed by the display device 118 via the input device 120.

Next, in step S1302, the CPU 103 analyzes the number of printed sheets with reference to a "number of monochrome printed sheets" counter 1303, a "number of color printed sheets" counter 1304, and a threshold value 1305. The "number of monochrome printed sheets" counter 1303 indicates the number of monochrome printed sheets having been output after performing the last calibration (i.e., the single-color calibration or the multi-color calibration). The "number of monochrome printed sheets" counter 1303 increments its count value each time when a monochrome printing is performed in an ordinary job. The "number of color printed sheets" counter 1304 indicates the number of color printed sheets having been output after performing the last calibration. The "number of color printed sheets" counter 1304 increments its count value each time when a color printing is performed in an ordinary job.

As an analyzing method, the following formula (1) is used to calculate a ratio R with reference to count values of the "number of monochrome printed sheets" counter 1303 and the "number of color printed sheets" counter 1304.

[Formula 1]

$$R = \frac{CNTm}{(CNTm + CNTc)} \quad (1)$$

In formula (1), CNTm represents the number of monochrome printed sheets, and CNTc represents the number of color printed sheets.

The threshold value 1305 is compared with the ratio R. If the ratio R is greater than the threshold value, the CPU 103 determines that the current print operation is mainly performed for the monochrome printing.

Next, in step S1306, the CPU 103 determines whether the monochrome printing output ratio is equal to or greater than a threshold value with reference to the ratio R and the threshold value 1305.

Figure 14A:
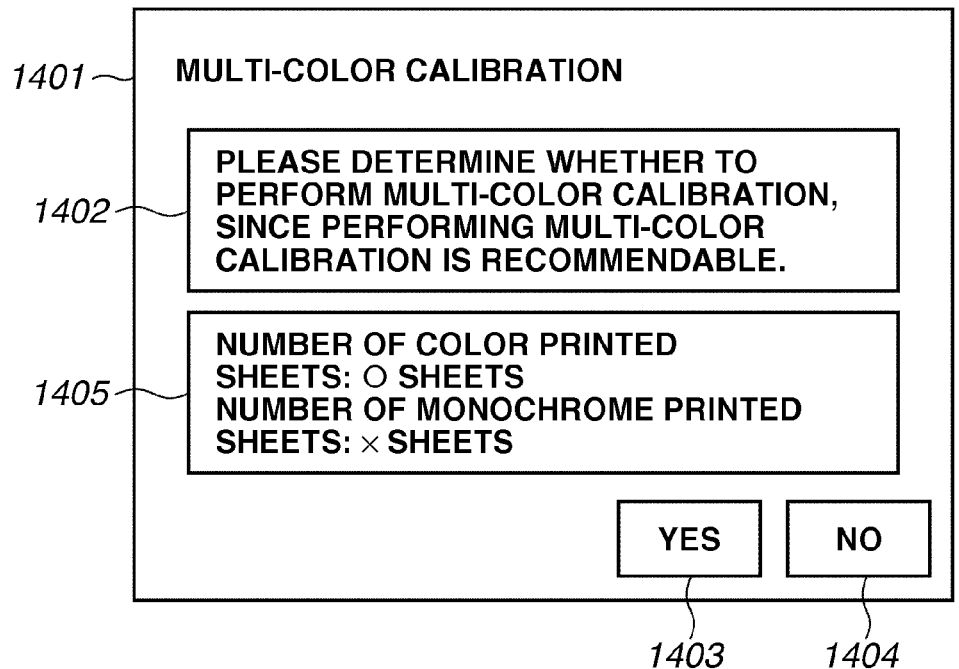
FIGS. 14A and 14B illustrate examples of UI screens according to the fourth exemplary embodiment.

If it is determined that the monochrome printing output ratio is less than the threshold value (NO in step S1306), then in step S1307, the CPU 103 causes the display device 118 to display a UI screen for recommending a user to perform the multi-color calibration. When the monochrome printing output ratio is less than the threshold value, the ratio of color printing is relatively high. Therefore, performing the multi-color calibration is useful to obtain high correction accuracy. FIG. 14A illustrates an example of a UI screen 1401 that can be displayed by the display device 118. The UI screen 1401 includes two buttons 1403 and 1404 that are similar to the buttons 803 and 804 illustrated in FIG. 8, and therefore redundant description thereof will be avoided. The UI screen 1401 includes a display field 1402 in which a message for recommending to perform the multi-color calibration and requesting a user to determine whether to perform the multi-color calibration is displayed. The UI screen 1401 includes a display field 1405 in which the number of color printed sheets and the number of monochrome printed sheets having been output after the last calibration are indicated, thus a user can check the number of output sheets in the display field 1405 as a criterion of determination.

Figure 14B:
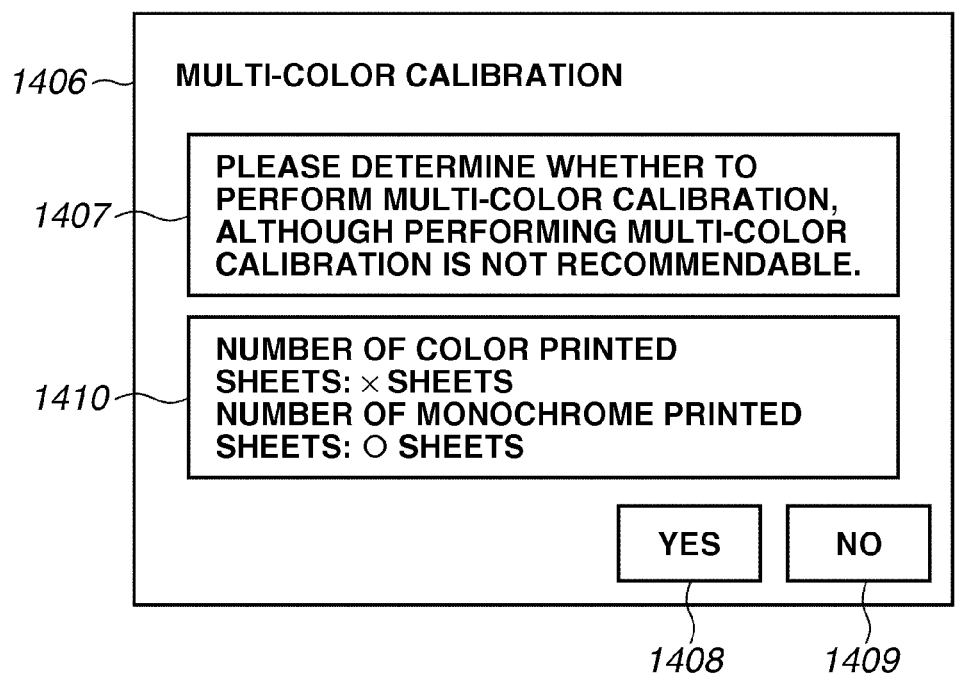

If it is determined that the monochrome printing output ratio is equal to or greater than the threshold value (YES in step S1306), then in step S1308, the CPU 103 causes the display device 118 to display a UI screen that does not recommend a user to perform the multi-color calibration. When the monochrome printing output ratio is equal to or greater than the threshold value, the ratio of monochrome printing is relatively high. Therefore, even if the multi-color calibration is performed, the validity is low. FIG. 14B illustrates an example of a UI screen 1406 that can be displayed by the display device 118. The UI screen 1406 includes two buttons 1408 and 1409 that are similar to the buttons 803 and 804 illustrated in FIG. 8, and therefore redundant description thereof will be avoided. The UI screen 1406 includes a display field 1407 in which a message for not recommending to perform the multi-color calibration and requesting a user to determine whether to perform the multi-color calibration without change is displayed. The UI screen 1406 includes a display field 1410 in which the number of color printed sheets and the number of monochrome printed sheets having been output after the last calibration are indicated, thus a user can check the number of output sheets in the display field 1410 as a criterion of determination.

In step S1309, the CPU 103 determines whether to perform the multi-color calibration. More specifically, the CPU 103 determines whether the selected button is the "YES" button 1403 (or 1408) or the "NO" button 1404 (or 1409).

If it is determined that the multi-color calibration is performed (YES in step S1309), then in step S1310, the CPU 103 performs the multi-color calibration. The processing to be performed in step S1310 is similar to the processing performed in steps S401 to S411, and therefore redundant description thereof will be avoided.

If it is determined that the multi-color calibration is not performed (NO in step S1309), then in step S1311, the CPU 103 performs the single-color calibration. The processing to be performed in step S1311 is similar to the processing performed in steps S301 to S315, and therefore redundant description thereof will be avoided.

Next, in step S1312, the CPU 103 initializes the "number of monochrome printed sheets" counter 1303 and the "number of color printed sheets" counter 1304, and then terminates the processing of the flowchart illustrated in FIG. 13. After the counter is initialized, the number of output sheets becomes zero.

According to the present exemplary embodiment, the threshold value 1305 is a fixed value. However, a user may set the threshold value 1305 via the display device 118 and the input device 120.

Further, according to the present exemplary embodiment, although the CPU 103 performs the single-color calibration when the multi-color calibration is not performed, the CPU 103 can terminate the processing of the flowchart illustrated in FIG. 13 without performing the single-color calibration.

According to the above-described exemplary embodiment, the system can request a user to determine whether to perform a single-color calibration before starting a multi-color calibration among two types of the calibrations. Thus, the system can prevent the correction accuracy in the multi-color calibration from deteriorating due to non-execution of the single-color calibration.

Further, the display of whether to recommend the multi-color calibration in the display unit can be switched according to the monochrome printing output ratio, so that a user can easily determine whether to perform the multi-color calibration.

Further, displaying the number of color printed sheets and the number of monochrome printed sheets is useful to enable a user to easily determine whether to perform the multi-color calibration.

Further, the present invention is applicable to an inkjet printer or a thermal printer although the above-described exemplary embodiments are described based on an electrophotographic apparatus. The scope of the present invention is not limited to a specific printer type. Further, the toner is an example of the recording agent usable in electrophotographic printing. However, any other appropriate recording agent (e.g., ink) can be used in the printing. The scope of the present invention is not limited to a specific recording agent type.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) (trademark)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Patent Application No. 2012-155530 filed Jul. 11, 2012, which is hereby incorporated by reference herein in its entirety.

What is claimed is:

1. An image processing apparatus having a printer configured to form an image and performing correction by using correction data when the image is formed by the printer, the image processing apparatus comprising:
    a sensor configured to obtain a measurement value by measuring an image formed by the printer;
    at least one processor configured to control:
        execution of a single-color calibration, the single-color calibration being executed to generate single-color image forming correction data that is to be used when a single-color image is formed by the printer, the single-color image forming correction data being generated in the single-color calibration by using the measurement value acquired by the sensor by measuring at least one single-color patch formed by the printer, the at least one single-color patch being formed by using a toner of a single kind of color;
        execution of a multi-color calibration, the multi-color calibration being executed to generate multi-color image forming correction data that is to be used when a multi-color image is formed by the printer, the multi-color image forming correction data being generated in the multi-color calibration by using the measurement value acquired by the sensor by measuring at least one multi-color patch formed by the printer, the at least one multi-color patch being formed by using a toner of multiple kinds of color;
        display of a first screen on a display for enabling a user to select whether to cause the at least one processor to perform the single-color calibration or the multi-color calibration; and
        display of a second screen on the display for enabling a user to select whether to cause the at least one processor to perform the multi-color calibration with performing the single-color calibration or to cause the multi-color calibration without performing the single-color calibration, if causing the at least one processor to perform the multi-color calibration is selected by the user via the first screen displayed on the display.

2. The image processing apparatus according to claim 1, wherein the at least one processor further operates to control display of a third screen for a user to select whether to cause the at least one processor to perform the multi-color calibration, after the single-color calibration has been selected by the user via the first screen displayed on the display and the single-color calibration has been performed by the at least one processor.

3. The image processing apparatus according to claim 1, wherein, in a case where the number of times that the multi-color calibration has been performed by the at least one processor while the single-color calibration has not been performed by the at least one processor is greater than a threshold value, the at least one processor further operates to control display of, before the multi-color calibration is performed by the at least one processor, a screen for prompting a user to cause the at least one processor to perform the single-color calibration.

4. The image processing apparatus according to claim 1, wherein, in a case where the number of times that the single-color calibration has been performed by the at least one processor while the multi-color calibration has not been performed by the at least one processor is greater than a threshold value, the at least one processor further operates to control display of, after the single-color calibration has been performed by the at least one processor, a screen for prompting a user to cause the at least one processor to perform the multi-color calibration.

5. The image processing apparatus according to claim 1, wherein, before the multi-calibration is performed by the at least one processor, a screen is displayed for indicating information to be used to determine whether to cause the at least one processor to perform the single-color calibration.

6. The image processing apparatus according to claim 5, wherein information usable in determining whether to cause the at least one processor to perform the single-color calibration is the number of times that multi-color calibration has been performed by the at least one processor after the single-color calibration has been performed by the at least one processor.

7. The image processing apparatus according to claim 1, wherein, in a case where a ratio of sheets output by single-color printing to the total number of sheets output after the single-color calibration or the multi-color calibration has been performed by the at least one processor is less than a threshold value, the at least one processor further operates to control display of a screen for prompting a user to cause the at least one processor to perform the multi-color calibration.

8. The image processing apparatus according to claim 1, wherein the at least one processor further operates to control display of the first screen for a user to select whether to cause the at least one processor to perform the single-color calibration, to perform the multi-color calibration or to perform the multi-color calibration after performing the single-color calibration.

9. The image processing apparatus according to claim 8, wherein the at least one processor further operates to control, after each predetermined time period, display of the first screen in such a manner that the user is able to select only to cause the at least one processor to perform the multi-color calibration after performing the single-color calibration.

10. The image processing apparatus according to claim 8, wherein the at least one processor further operates to control, each time that a predetermined number of sheets have been used in printing, display of the first screen in such a manner that the user is able to select only to cause the at least one processor to perform the multi-color calibration after performing the single-color calibration.

11. The image processing apparatus according to claim 8, wherein the at least one processor further operates to control, in response to turn on a power source of the image processing apparatus, display of the first screen in such a manner that the user is able to select only to cause the at least one processor to perform the multi-color calibration after performing the single-color calibration.

12. A method for calibrating an image processing apparatus which has a printer configured to form an image, performs correction by using correction data when the image is formed by the printer, and has a sensor configured to obtain a measurement value by measuring an image formed by the printer, the method comprising:
   performing at least one of a single-color calibration and a multi-color calibration, the single-color calibration being executed to generate single-color image forming correction data that is to be used when a single-color image is formed by the printer, the single-color image forming correction data being generated in the single-color calibration by using the measurement value acquired by the sensor by measuring at least one single-color patch formed by the printer, the at least one single-color patch being formed using a toner of a single kind of color;
   the multi-color calibration being executed to generate multi-color image forming correction data that is to be used when a multi-color image is formed by the printer, the multi-color image forming correction data being generated in the multi-color calibration by using the measurement value acquired by the sensor by measuring at least one multi-color patch formed by the printer, the at least one multi-color patch being formed by using a toner of multiple kinds of color;
   displaying a first screen on a display for enabling a user to select whether to perform the single-color calibration or the multi-color calibration; and
   displaying a second screen on the display for a user to select whether to perform the multi-color calibration with performing the single-color calibration or to perform the multi-color calibration without performing the single-color calibration, if performing of the multi-color calibration is selected by the user via the displayed first screen.

13. The method according to claim 12, further comprising:
   displaying a screen, after the single-color calibration has been selected and the single-color calibration has been performed, for a user to select whether to perform the multi-color calibration.

14. The method according to claim 12, wherein:
   in a case where the number of times that the multi-color calibration has been performed while the single-color calibration has not been performed is greater than a threshold value, before the multi-color calibration is performed, a screen is displayed for prompting a user to select to perform the single-color calibration.

15. The method according to claim 12, wherein:
   in a case where the number of times that the single-color calibration has been performed while the multi-color calibration has not been performed is greater than a threshold value, after the single-color calibration has been performed, a screen is displayed for prompting a user to select to perform the multi-color calibration.

16. The method according to claim 12, wherein:
   in a case where displaying before the multi-calibration is performed, a screen is displayed for indicating information to be used to determine whether to perform the single-color calibration.

17. The method according to claim 12, wherein the first screen is displayed for the user to select whether to perform the single-color calibration, to perform the multi-color calibration or to perform the multi-color calibration after performing the single-color calibration.

18. The method according to claim 17, wherein, at every predetermined time period, the first screen is displayed in such a manner that the user is able to select only the performing of the multi-color calibration after performing of the single-color calibration.

19. The method according to claim 17, wherein, each time when a predetermined number of sheets are used in printing, the first screen is displayed in such a manner that the user is able to select only to perform the multi-color calibration after performing the single-color calibration.

20. The method according to claim 17, wherein, in response to turning on a power source of an image processing apparatus, the first screen is displayed in such a manner that the user is able to select only to perform the multi-color calibration after performing the single-color calibration.

* * * * *